April 19, 1949.　　　W. D. WALTERS　　　2,467,569
CHUCK

Filed March 18, 1946

INVENTOR.
William D. Walters
BY
Harness, Dickey & Pierce.
ATTORNEYS.

Patented Apr. 19, 1949

2,467,569

UNITED STATES PATENT OFFICE 2,467,569

CHUCK

William D. Walters, Detroit, Mich., assignor to Cogsdill Twist Drill Company, Inc., Detroit, Mich., a corporation of Michigan Application March 18, 1946, Serial No. 655,125

5 Claims. (Cl. 279—57)

The invention relates to improvements in chucks for holding cutting tools, workpieces, and the like.

Conventional chucks of the type to which this invention relates are used for many purposes. For example, they may be used for holding a cutting tool or for holding a workpiece that is being operated upon. It is in connection with this latter use that the present invention is primarily concerned, although it will be apparent that it has broader utility and can be employed in any capacity where these chucks are generally used.

According to conventional practice the chucks are usually equipped with a manually actuated nut or nosepiece which is rotated in one direction to tighten the gripping jaws and in the opposite direction to loosen them. Manifestly, the nut or nosepiece cannot be actuated until the chuck has stopped rotating without danger to the operator, and, even then, the operation of changing the workpiece requires considerable time. In fact, it frequently takes longer to remove a workpiece from the chuck and insert another in its place than to perform the actual operation on the workpiece. Manifestly, the time spent in changing workpieces is lost time and results in higher production costs.

An important object of the present invention is to provide a quick-action chuck which is uniquely constructed to expedite the operation of changing workpieces.

Another object of the invention is to provide a chuck in which workpieces can be released or clamped while the machine is still moving.

Still another object of the invention is to provide a chuck which permits exceedingly rapid insertion or removal of the workpiece.

Yet another object of the invention is to provide a chuck of the above-mentioned character which automatically centers the workpiece when the gripping jaws are tightened.

A further object of the invention is to provide a chuck that is simple in construction, efficient in operation, and relatively inexpensive to manufacture.

Other objects and advantages of the invention will be apparent during the course of the following description.

In the drawings forming a part of this specification and wherein like numerals are employed to designate like parts throughout the same, Fig. 1 is a side elevational view of a chuck embodying the invention showing a workpiece in the chuck and the latter mounted in the spindle of a machine tool;

Fig. 5 is a transverse sectional view taken on the line 5—5 of Fig. 4.

Figure 1:
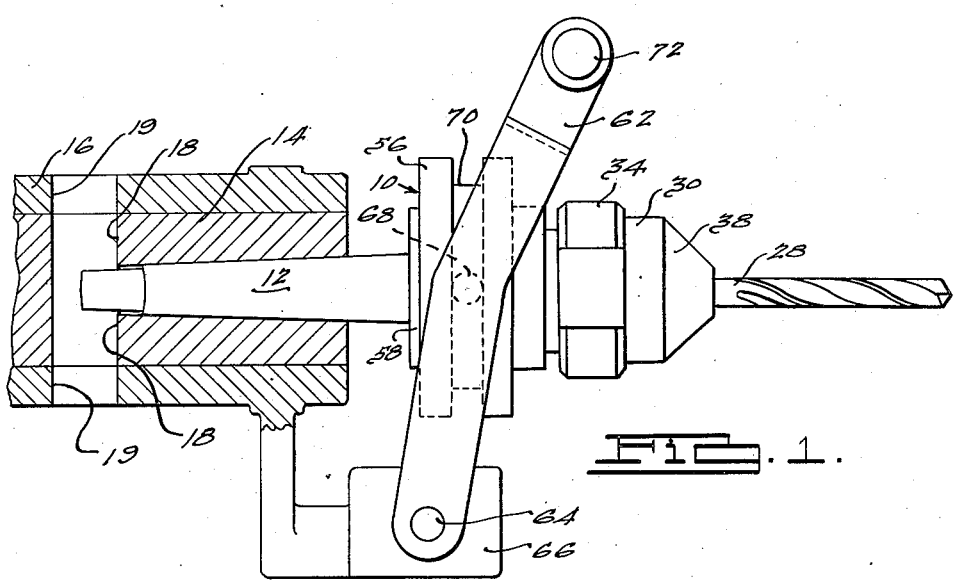

In the drawings wherein, for the purpose of illustration, is shown a preferred embodiment of the invention, the numeral 10 designates the holder or main body of the chuck. At its rearward end the holder 10 is provided with the usual tapered shank 12 for mounting in the spindle 14 of a conventional machine tool, as shown in Fig. 1. The spindle 14 rotates in a quill 16 and both the spindle and quill are provided with registerable openings 18 and 19 which define the usual "drift" hole for permitting the shank 12 to be driven out of the spindle 14.

At its forward end holder 10 is provided with a socket 20 which closely but slidably accommodates a sleeve 22. The latter, in turn, slidably receives a collet 24 which is provided with the usual longitudinal slots 26. These slots extend alternately from opposite ends of the collet and make the latter radially expansible and contractible over its entire length so that it functions as a gripping member or jaw for a workpiece such as the drill 28.

A nosepiece 30 is slidably and rotatably mounted on the cylindrical forward portion 32 of the holder 10, and the rear portion 34 thereof is internally screw-threaded to engage external threads 36. The fit between the nosepiece 30 and the portion 32 is close so as to maintain the nosepiece 30 concentric with the axis of rotation of the tool. At its forward end the nosepiece 30 is provided with a tapered portion 38 which surrounds and engages the forwardly projecting end of the collet 24 to limit axial movement of the latter.

In order that the collet 24 may be held normally rigid and function as a gripping jaw, its projecting terminal portion is provided with concentric longitudinally spaced, oppositely tapered, annular cam surfaces 40 and 42. Cam surface 40 faces rearwardly and engages an annular concentric tapered seat 44 provided at the forward end of sleeve 22. Cam surface 42 faces forwardly and seats against the tapered inner surface 46 of the nosepiece 30. It will be readily apparent that when nosepiece 30 is tightened against the collet 24, cam surfaces 40 and 42 automatically center the latter, and sleeve 22 coacts with the nosepiece to hold the collet solidly in the selected adjusted position.

In practice, the nosepiece 30 is normally stationary, and the collet 24 is tightened or loosened on the workpiece 28 by sliding the sleeve 22 axially in the holder 10. Forward movement of the sleeve 22 presses the tapered seat 44 against cam surface 40 and contracts the collet 24. Conversely, rearward movement of sleeve 22 releases the collet 24 so that the inherent resiliency of the latter causes it to expand.

Figures 2, 3:
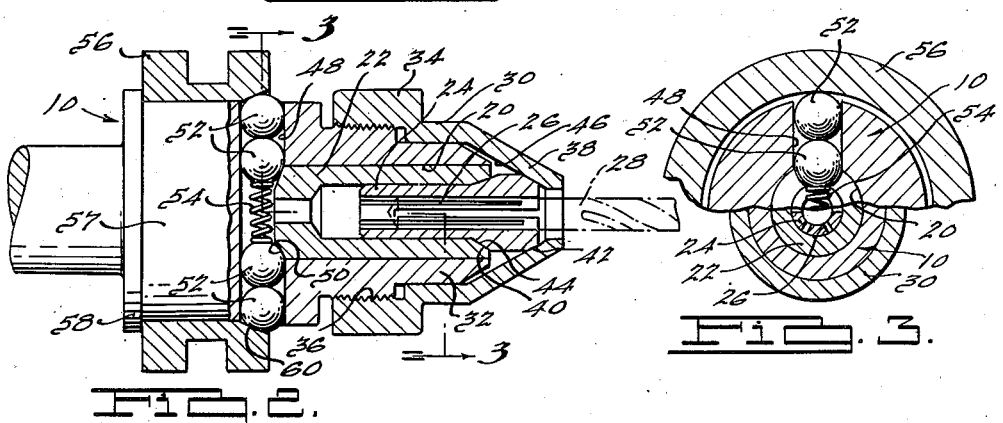
Fig. 2 is a fragmentary, longitudinal sectional view of the chuck.
Fig. 3 is a transverse sectional view taken on the line 3—3 of Fig. 2.

According to the present invention the holder 10 is equipped with mechanism for slidably actuating the sleeve 22, and, as suggested, the mechanism can be operated while the spindle 14 is still rotating. The holder 10 is provided with a transverse passage 48 which intersects the inner portion of socket 20 and, as shown in Fig. 2, the rear terminal portion of sleeve 22 is tapered to provide a conical cam or pressure surface 50 which projects part way across the passage. Mounted in the passage 48 at opposite sides of the sleeve 22 are force transmitting members, or detents, which broadly may be of any desired shape or configuration but are conveniently formed as balls 52, shown by way of example, which may be normally held apart and away from the pressure surface 50 by a compression spring 54. In this normal position of the balls 52, sleeve 22 is retracted and collet 24 is expanded to release the workpiece 28. Also, when thus positioned, the balls 52 project slightly from the passage 48 and in the path of a collar 56 which is slidably and rotatably mounted on a cylindrical portion 57 of the holder and immediately behind the passage. Rearward movement of the collar 56 is limited by an annular flange 58 formed integrally on the holder 10, and, when the collar is retracted against the flange, an inwardly tapered, annular seat 60 provided at its forward end accommodates the projecting portions of balls 52. However, when collar 56 is pushed forwardly, pressure applied by the seat 60 against the balls 52 forces the latter radially inwardly against the pressure surface 50 to advance the sleeve 22 and contract the collet 24 against workpiece 28.

Convenient manual operation of the collar 56 is provided by a yoke 62 which straddles the chuck and is pivoted as at 64 on any suitable part 66 of the machine which moves with the quill 16. Intermediate their ends the yoke arms carry inwardly extending pins 68 which project into a peripheral groove 70 in collar 56. At its upper end the yoke is provided with a handle 72 which is readily accessible to the operator and can be manipulated without danger of contacting moving parts of the machine.

To contract the collet 24 against workpiece 28 the handle 72 is pushed forwardly (viz., to the right as viewed in Fig. 1). This operation rocks the yoke 62 about pivots 64 and presses pin 68 against the forward wall of groove 70 to slide collar 56 forwardly on the holder 10. Conversely, to expand the collet 24 so that it releases the workpiece 28, handle 72 is moved rearwardly (viz., to the left, as viewed in Fig. 1), so that pins 68 push the collar 56 back against flange 58 and release the ball detents 52.

To initially adjust the chuck for a workpiece the collar 56 is retracted to the position shown in Fig. 2, and the nosepiece 30 is loosened to release the collet 24. The workpiece is then inserted in the collet and collar 56 is advanced to depress the balls 52. Nosepiece 30 is then tightened against the collet 24 by means of a wrench or other suitable means. Since the balls 52 hold the sleeve 22 stationary, tightening of the nosepiece 30 contracts the collet 24 solidly against the workpiece. No further adjustment is required, and the chuck is set for operation. When collar 56 is retracted, balls 52 move outwardly away from the pressure surface 50, and sleeve 22 slides rearwardly so that collet 24 can expand and release the workpiece.

From the foregoing it will be readily apparent that collet 24 is expanded merely by pushing handle 62 forwardly and contracted by pushing the handle rearwardly. Thus, the workpiece can be released immediately after the operation on it is completed and while the chuck is still turning. Even more important is the fact that the handle 72 can be operated quickly and easily and workpieces changed in a minimum of time. Manifestly, considerable radial adjustment of the collet is possible by reason of the cam surfaces 40 and 42. As a result, the collet completely releases the workpiece when handle 72 is pushed rearwardly and clamps it solidly when the handle is pulled forwardly.

Figure 4:
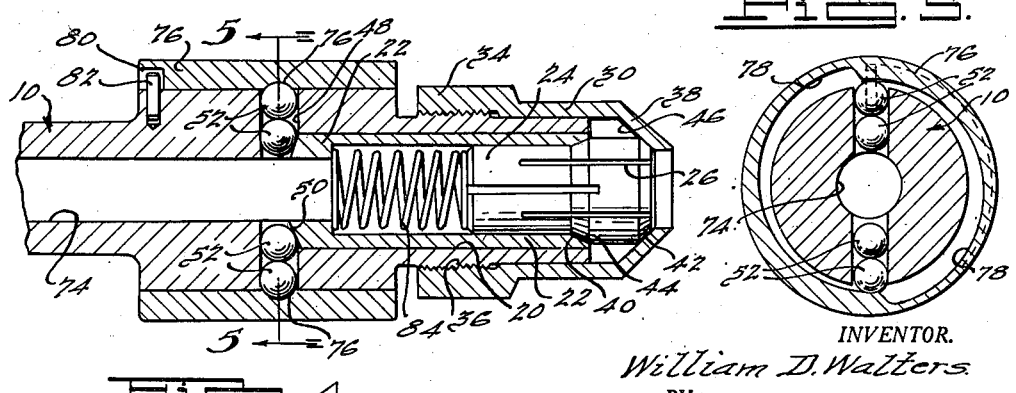
Fig. 4 is a longitudinal sectional view of a modified form of the invention.

Figs. 4 and 5 show a modified construction in which the holder 10 is provided with a longitudinal bore 74 which extends rearwardly from the socket 20 through the shank 12, and the balls 52 are actuated by a different type of collar 76. In this form of the invention, collar 76 is axially fixed but rotatable on the holder 10 and is mounted to surround the passage 48. In its under surface the collar 76 is provided with grooves 78 which receive the outermost balls 52. As shown in Fig. 5, two grooves 78 are provided, one for each pair of balls. Each groove 78 extends approximately half way around the sleeve and both grooves increase progressively in depth and in the same direction so that the bottom surfaces thereof are disposed spirally around the holder 10. The outer balls 52 seat against the bottom of grooves 78 (Fig. 4) which thus define cam surfaces for moving the balls radially in passage 48 and relative to the pressure surface 50 when sleeve 76 is rotated. Manifestly, the balls 52 are forced against the pressure surface 50 when sleeve 74 is rotated in one direction and released for movement away from the pressure surface when the sleeve is rotated in the opposite direction. Rotative movement of the collar 76 is limited by a recess 80 in the inner surface of the collar and pin 82 carried by the holder 10.

Although the balls 52 can be forced away from pressure surface 50 by a compression spring interposed therebetween in the manner hereinabove described, an alternative expedient is here shown in the form of a coil spring 84 disposed in the sleeve 22 behind collet 24. When balls 52 drive sleeve 22 forwardly to contract the collet 24, spring 84 is compressed; and, when the balls are released, spring 84 retracts the sleeve 22 so that collet 24 can expand. It will be observed that this spring arrangement leaves the bore 74 unobstructed.

Except for the features specifically described, this form of the invention is identical or similar in construction and operation to the form first described.

It is to be understood that the forms of the invention herewith shown and described are to be taken as preferred examples of the same and that various changes in the size, shape, and arrangement of parts may be resorted to without departing from the spirit of the invention or the scope of the appended claims.

Having thus described the invention, I claim:

1. In a chuck, a radially adjustable collet having an external conical cam surface and adapted to receive a workpiece; a sleeve slidably receiving the collet and provided at one end thereof with a tapered external pressure surface and an annular tapered internal seat for said cam surface; a holder slidably receiving the sleeve and spaced from the mentioned end of the latter; means carried by the holder for limiting axial movement of the collet; actuator means mounted for radial sliding movement in the holder, said actuator means having outer cam surfaces which normally project from the holder and inner cam surfaces arranged to engage the external pressure surface of the sleeve; resilient means arranged transversely to the mentioned end of the sleeve and below said actuator means, said resilient means adapted to be compressed by the actuator means when the latter moves radially against the pressure surface of said sleeve whereby to exert a positive action tending to release the actuator means from said sleeve; and a collar slidably mounted on the holder, said collar having a tapered internal surface positioned to engage the outer cam surfaces of the actuator means, whereby movement of the collar against said actuator means forces the latter against the pressure surface to compress said resilient means and slidably actuate the sleeve against the cam surface of the collet.

2. In a chuck, a holder having a socket and a transverse passage through the socket; a sleeve slidably mounted in the socket; a nosepiece carried by and normally fixed on the holder; said sleeve and said nosepiece provided with axially spaced, oppositely tapered conical cam seats; a collet slidably mounted in the sleeve having axially spaced conical cam surfaces which mate with and are positioned to engage respective cam seats whereby said collet is held against axial movement and automatically centered by said cam surfaces; ball detent means disposed in said transverse passage; said detent means seating against the inner end of said sleeve and projecting radially from the holder; spring means disposed transversely to the inner end of said sleeve and confined by the ball detent means, whereby said spring means yieldably resists movement of the detent means against said sleeve and when so compressed exerts a positive resilient action against the detent means tending to release the latter from said sleeve; a collar slidably mounted on the holder having a conical internal seat movable against said projecting detent means to force the same radially inwardly against said sleeve; and manually operable means for sliding the collar on said holder.

3. A chuck comprising a holder having a socket in one end thereof and a transverse passage which intersects the socket; a sleeve slidably mounted in the socket with the inner end thereof normally projecting part way across the passage, said sleeve provided at its outer end with a tapered internal seat and at its inner end with a tapered external pressure surface; a collet slidably mounted in the sleeve and having external, longitudinally spaced, oppositely tapered cam surfaces one of which engages the internal seat of said sleeve; a nosepiece threaded on the holder and surrounding the collet, said nosepiece provided with a tapered internal seat which engages the other cam surface of the collet; an actuator means slidably mounted in the transverse passage of the holder having cam surfaces seating against the tapered pressure surface of the sleeve; means slidable on the holder for forcing said actuator means radially against the sleeve; and spring means constructed and arranged to resist radial movement of said actuator means and to exert a positive action against said actuator means when the latter moves against the sleeve tending to force the actuator means in a direction to release said sleeve.

4. A chuck comprising a holder having a longitudinal bore one end of which is enlarged to form a socket and a transverse passage which intersects the socket; a sleeve slidably mounted in the socket with the inner end thereof normally projecting part way across the passage, said sleeve provided at its outer end with a tapered internal seat and at its inner end with a tapered external pressure surface; a collet slidably mounted in the sleeve and having external, longitudinally spaced, oppositely tapered cam surfaces one of which engages the internal seat of the sleeve; a nosepiece mounted on the holder and surrounding the collet, said nosepiece provided with a tapered, internal seat which engages the other cam surface of the collet; cam members slidably mounted in the transverse passage of the holder, said cam members having outer cam surfaces which normally project from the holder and inner cam surfaces which seat against the tapered pressure surface of the sleeve; and a collar rotatably mounted on the holder and around the cam members, said collar provided with internal grooves which accommodate the cam members and said grooves having bottom surfaces arranged spirally around the holder to define cam seats for the cam members which move the latter radially when the collar is rotated.

5. In a chuck, a radially adjustable collet having an external conical cam surface and adapted to receive a workpiece; a sleeve slidably receiving the collet and provided at one end thereof with a tapered external pressure surface and an annular tapered internal seat for said cam surface; a holder slidably receiving the sleeve and spaced from the mentioned end of the latter; means carried by the holder for limiting axial movement of the collet; actuator means mounted for radial sliding movement in the holder, said actuator means having outer cam surfaces which normally project from the holder and inner cam surfaces arranged to engage the external pressure surface of the sleeve; resilient means arranged to exert a positive force against the actuator means tending to move the latter away from the external surface of said sleeve; and a collar movably mounted on the holder, said collar having a tapered internal surface positioned to engage the outer cam surfaces of the actuator means, whereby movement of the collar against said actuator means forces the latter against the pressure surface to compress said resilient means and to slidably actuate the sleeve against the cam surface of the collet, and whereby compression of said resilient means creates a positive force tending to release the actuator means from the said sleeve.

WILLIAM D. WALTERS.

REFERENCES CITED

The following references are of record in the file of this patent:

UNITED STATES PATENTS

| Number | Name | Date |
| --- | --- | --- |
| 442,230 | Libby | Dec. 9, 1890 |
| 1,263,270 | Millholland | Apr. 16, 1918 |
| 2,393,806 | Pilling | Jan. 29, 1946 |
| 2,396,006 | Hull | Mar. 5, 1946 |
| 2,400,183 | Wilson | May 14, 1946 |

FOREIGN PATENTS

| Number | Country | Date |
| --- | --- | --- |
| 208,396 | Switzerland | Jan. 31, 1940 |